US006473417B1

(12) United States Patent
Herzog

(10) Patent No.: US 6,473,417 B1
(45) Date of Patent: Oct. 29, 2002

(54) METHOD AND APPARATUS FOR INTERFERENCE CANCELLATION FOR A HIGH DATA RATE USER IN A CDMA SYSTEM

(75) Inventor: Rupert Herzog, Munich (DE)

(73) Assignee: QualComm Incorporated, San Diego, CA (US)

( * ) Notice: Subject to any disclaimer, the term of this patent is extended or adjusted under 35 U.S.C. 154(b) by 0 days.

(21) Appl. No.: 09/371,233

(22) Filed: Aug. 10, 1999

Related U.S. Application Data

(63) Continuation of application No. PCT/US98/16815, filed on Aug. 13, 1998.
(60) Provisional application No. 60/055,549, filed on Aug. 13, 1997.

(51) Int. Cl.⁷ .............................................. H04B 7/216
(52) U.S. Cl. ...................... 370/342; 370/441; 375/144; 375/148
(58) Field of Search ............................... 455/63, 226.1; 370/208, 209, 335, 342, 241, 249, 441; 375/144, 148, 240.07, 278, 284, 285, 346, 348

(56) References Cited

U.S. PATENT DOCUMENTS

| | | | | |
|---|---|---|---|---|
| 5,136,612 A | * | 8/1992 | Bi .............................. | 370/342 |
| 5,396,516 A | * | 3/1995 | Padovani et al. ........... | 370/342 |
| 5,623,485 A | * | 4/1997 | Bi .............................. | 370/209 |
| 5,761,634 A | * | 6/1998 | Stewart et al. .............. | 704/220 |
| 6,175,587 B1 | * | 1/2001 | Madhow et al. ............ | 375/148 |

OTHER PUBLICATIONS

Hagenauer, J. "Forward Error Correcting for CDMA Systems" IEEE 4th Int'l. Symposium on Spread Spectrum Techniques and Applications Proceedings 2:22–25 (1996).

Herzog, et al. "Iterative Decoding and Despreading Improves CDMA–Systems Using M–ary Orthogonal Modulation and FEC" IEEE Int'l Conference on Communications 2: 909–913 (1997).
Herzog, R. "Interference Cancellation for a High Data Rate User in Coded CDMA Systems" IEEE Int'l Conference on Communications 2: 709–713 (1998).
Sanada, et al. "A Co–Channel Interference Cancellation Technique Using Orthogonal Convolutional Codes" IEEE Transactions on Communications 44(5): 549–556 (1996).

* cited by examiner

Primary Examiner—Nay Maung
Assistant Examiner—Quochien B. Vuong
(74) Attorney, Agent, or Firm—Philip Wadsworth; Sean English; Pavel Kalousek

(57) ABSTRACT

A method and apparatus for reducing co-channel interference in a CDMA radio telephone system wherein a traffic channel signal is transmitted from a first station (e.g., a base station) 100 in the system to a second station in the system (e.g., a mobile station) 200. The traffic channel signal contains information representative of a plurality of CDMA data signals each of which is modulated with a different Walsh code prior to transmission of the traffic channel signal from the first station 100 to the second station 200. A reduced interference signal is formed at the second station 200 by subtracting an interference signal from the traffic channel signal. A decoded signal is formed at the second station 200 by decoding information representative of the reduced interference signal using a decoder 260 that outputs a plurality of metric values. The metric values are then used as inputs to a feedback loop 270, 272, 274, 276, 278, 280 that is used to form the interference signal that is subtracted from the traffic channel signal. In this feedback loop 270, 272, 274, 276, 278, 280, an estimated signal is formed in accordance with the plurality of metric values, a plurality of reconstructed CDMA signals are formed from the estimated signal, each of the reconstructed CDMA signals being modulated in accordance with a different one of the Walsh codes, and the reconstructed CDMA signals are then used to form to the interference signal.

27 Claims, 2 Drawing Sheets

METHOD AND APPARATUS FOR INTERFERENCE CANCELLATION FOR A HIGH DATA RATE USER IN A CDMA SYSTEM

CROSS REFERENCE

This application claims priority from PCT application No. PCT/US98/16815, filed Aug. 13, 1998 entitled "Method and Apparatus for Interference Cancellation for a High Rate User in a CDMA System" assigned to the assignee of the present invention.

BACKGROUND OF THE INVENTION

I. Field of the Invention

The present invention relates to wireless communications. More specifically, the present invention relates to wireless communication systems that transmit and receive signals between base stations and mobile stations in accordance with code division multiple access (CDMA) modulation. Even more specifically, the present invention relates to a method and apparatus for reducing co-channel interference in a CDMA system in cases where the same user is simultaneously transmitting data on multiple CDMA channels in order to, for example, achieve a high data rate.

II. Description of the Related Art

In multi-code (MC) CDMA radio telephone systems, several CDMA signals associated with a single user may be sent between two stations in order to provide the user with a higher data rate. In such systems, each CDMA signal associated with a single user is spread using direct sequence (DS) spreading and orthogonal Walsh codes, and the spread signals are scrambled using pseudo-noise (PN). However, the transmission quality of the CDMA signals in such systems typically degrades when the signals travel over more than one path between the transmitter and the receiver. This is because such "multi-path propagation" causes co-channel interference between the transmitted CDMA signals. The present invention is directed to a method and apparatus for reducing (or canceling) such co-channel interference.

SUMMARY OF THE INVENTION

Disclosed herein is a method and apparatus for reducing co-channel interference in a CDMA radio telephone system. The disclosed system transmits a traffic channel signal from a first station (e.g., a base station) to a second station (e.g., a mobile station). The traffic channel signal contains a plurality of CDMA data signals, each data signal modulated with a different Walsh code prior to transmission of the traffic channel signal from a first station to a second station. In one embodiment of the disclosed system, the traffic channel signal contains a plurality of CDMA data signals associated with a single user. Each of the CDMA data signals associated with the single user is modulated with a different Walsh code prior to transmission of the traffic channel signal from the first station to the second station. Use of the plurality of CDMA data signals for the single user facilitates transmission of data at a relatively high data rate for the single user, because such signals permit the simultaneous transmission of data associated with the single user on multiple CDMA channels.

In accordance with the preferred embodiment of the disclosed method and apparatus, a "reduced interference signal" is formed at the second station in an iterative fashion by subtracting an interference signal from the traffic channel signal. A "decoded signal" is formed at the second station by decoding information represented by the reduced interference signal using a decoder (e.g., a convolutional or turbo decoder) that outputs a plurality of metric values. It should be noted that the first iteration has no correction. The metric values are then used as inputs to a feedback loop that is used to form the interference signal that is subtracted from the traffic channel signal. In this feedback loop: (1) an estimated signal is formed in accordance with the plurality of metric values; (2) plurality of reconstructed CDMA signals are formed from the estimated signal; (3) each of the reconstructed CDMA signals being modulated in accordance with a different one of the Walsh codes; and (4) the reconstructed CDMA signals are combined, scrambled and filtered to form the interference signal.

BRIEF DESCRIPTION OF THE DRAWINGS

The features, objects and advantages of the present invention will become more apparent from the detailed description set forth below when taken in conjunction with the drawings in which like reference characters identify correspondingly throughout and wherein.

DETAILED DESCRIPTION OF THE PREFERRED EMBODIMENTS

Disclosed herein is a method and apparatus for reducing co-channel interference in a CDMA radio telephone system. The present invention is included within the disclosed method and apparatus. However, the scope of the invention is to be determined solely by the limitations of the claims appended hereto, and not by the limitations of the disclosed method and apparatus.

Figure 1:
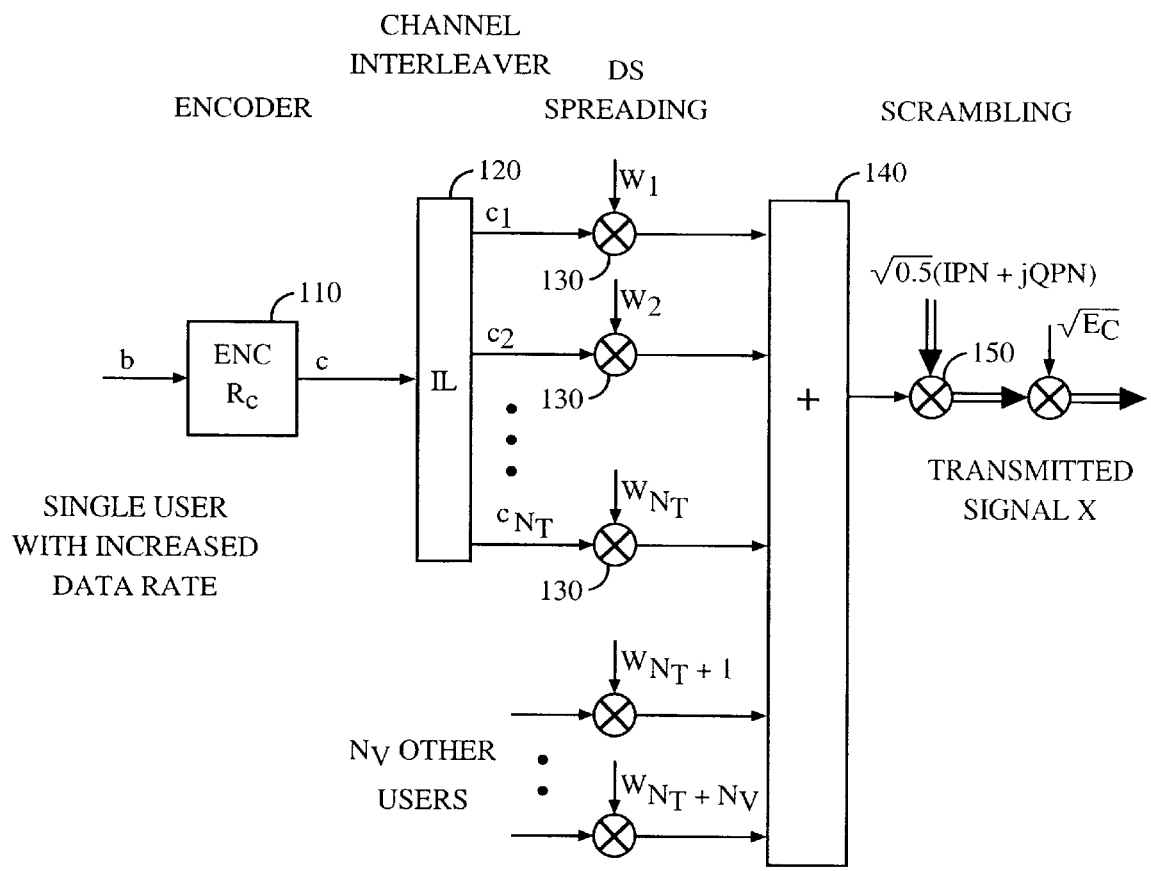
FIG. 1 is a block diagram of a remote station (e.g., a base station) that encodes, processes and transmits CDMA signals in accordance with the present invention.

FIG. 1 is a block diagram of a remote station 100 (e.g., a base station) that encodes, processes and transmits CDMA signals in accordance with the disclosed method and apparatus. A "data information signal" (b) from a single user operating at an increased data rate is provided to a convolutional encoder 110 in order to form an "encoded data signal" (c). Encoder 110 encodes the data information signal in accordance with a convolutional coding algorithm or a parallel concatenated convolutional coding algorithm (i.e., a "turbo" code) with code rate $R_c$. One example of a code that may be used for encoding by encoder 110 is a terminated non-systematic convolutional code (CC) with a code rate $R_c = \frac{1}{2}$ and memory m=4, defined by the generator matrix set forth in equation (1) below:

$$G_{cc4}(D) = (1+D^3+D^4 1+D+D^2+D^4) \qquad (1)$$

A second exemplary code that may be used for encoding by encoder 110 is a terminated CC having memory m=8, defined by the generator matrix set forth in equation (2) below:

$$G_{cc8}(D) = (1+D+D^2+D^3+D^5+D^7+D^8 1+D^2+D^3+D^4+D^8) \qquad (2)$$

A third exemplary code that may be used for encoding by encoder 110 is a parallel concatenated convolutional code (PCC) (also known as a turbo code) which consists of two equal systematic component codes, defined by the generator matrix set forth in equation (3) below:

$$G_{PCC}(D)=(1(1+D^4)/(1+D+D^2+D^3+D^4)) \quad (3)$$

The resulting code rate of this third exemplary code is $R_c=\frac{1}{3}$. Thus, the code rate of the exemplary PCC is 1.5 times slower than that of the exemplary CC's set forth above. Given a constant user data rate, the lower code rate requires a 1.5 times greater number of assigned traffic channels ($N_T$) than that required when the exemplary CC's are used.

It will be understood by those skilled in the art that additional coding algorithms other than the three examples set forth above may alternatively be used.

The encoded data signal (c) from encoder 110 is provided to a channel interleaver (il) 120. Interleaver 120 consists of $N_T$ block interleavers (not shown) each of which corresponds to one of the $N_T$ traffic channels. In a preferred embodiment, each of the $N_T$ block interleavers has a block size of 384 code bits (i.e., 20 ms at 19.2 kbps). Prior to the interleaving, the code bits from the encoded data signal (c) are demultiplexed to the $N_T$ traffic channels in the following way: The first contiguous block of 384 code bits from the encoded data signal (c) are provided to the block interleaver corresponding to a first traffic channel $c_1$, the next contiguous block of 384 code bits from the encoded data signal (c) are provided to the block interleaver corresponding to a second traffic channel $c_2$, and so on such that the $N_T$th contiguous block of 384 code bits from the encoded data signal (c) are provided to the block interleaver corresponding to a $N_T$th traffic channel $c_{NT}$. This demultiplexing method ensures that subsequent code bits are not transmitted at the same time.

The $N_T$ interleaved signals output by the block interleaver 120 are provided to modulation units 130, where each of the interleaved signals is multiplied with a Walsh sequence ($w_i$). In a preferred embodiment, the outputs of the modulation units are fixed rate signals having a chip rate of 1.2288 Mcps. The set of Walsh codes preferably consists of 64 binary sequences (each with a length of W=64) which are orthogonal to each other and provide ideal channel separation at the receiver in the absence of multipath propagation. The modulation units 130 output a plurality of spread signals that are combined using summer 140 to form a composite signal that is output from summer 140. As shown in FIG. 1, the signals input to summer 140 may optionally include spread signals associated with users other than the signal user associated with data information signal (b). The composite signal output from summer 140 is applied to a scrambler 150 which scrambles the inphase and quadrature components of the composite signal using pseudo-noise (PN) to form a scrambled signal. The scrambled signal is then normalized to form a traffic channel signal (x) by multiplying the scrambled signal with an amplitude factor $(E_c)^{1/2}$, where $E_c$ is the transmitted energy per chip of the traffic channel signal.

Figure 2:
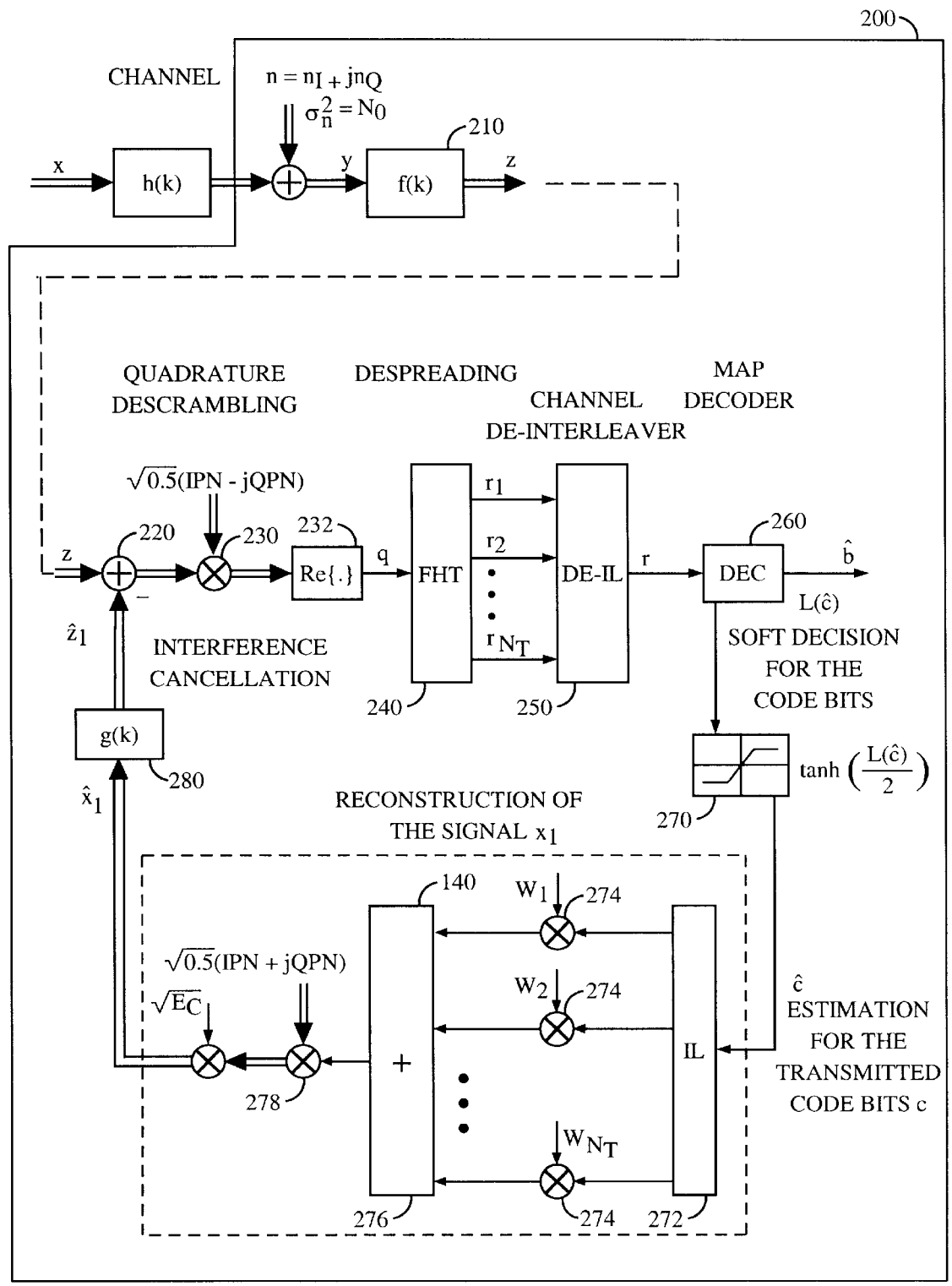
FIG. 2 is a block diagram of a remote station (e.g., a mobile station) that receives, demodulates and decodes CDMA signals in a manner that reduces co-channel interference, in accordance with the present invention.

FIG. 2 is a block diagram of a remote station 200 (e.g., a mobile station) that receives, demodulates and decodes CDMA signals in a manner that reduces co-channel interference, in accordance with the disclosed method and apparatus. The traffic channel signal (x) is transmitted from remote station 100 to remote station 200 over a traffic channel having an impulse response characteristic (h(k)). Upon reception at remote station 200, noise is added to the signal due to the physics of, and imperfections in, the receiver. The resulting signal (y) is applied to a filter 210 which has an impulse response characteristic (f(k)) that is matched to the impulse response of the traffic channel, i.e., f(k)=h*(−k). The output traffic channel signal from filter 210 is denoted in FIG. 2 as signal (z).

The traffic channel signal (z) and an interference signal ($z_1$) are applied to a signal subtracting unit 220 which subtracts the interference signal ($z_1$) from the traffic channel signal (z). The output of the subtracting unit 220 is applied to descrambling units 230, 232. Descrambling unit 230 multiplies the output of the subtracting unit 220 by the complex conjugate of the scrambling sequence used by scrambler 150. Unit 232 then takes the real part of the signal output from unit 230 to form a descrambled signal (q). The descrambled signal (q) is applied to a signal processor 240 that applies a Fast-Hadamard Transform (FHT) to the descrambled signal (q) so as to correlate the descrambled signal (q) with each of the Walsh functions used by modulators 130. The output of signal processor 240 is a plurality of de-spread signals ($r_1, r_2, \ldots r_{NT}$), each of which corresponds to one of the Walsh functions used by modulators 130. Next, the de-spread signals ($r_1, r_2, \ldots r_{NT}$) are applied to a de-interleaver (de-il) 250, which performs the inverse of the operation performed by interleaver 120 in order to form a de-interleaved signal (r).

The de-interleaved signal is applied to decoder 260 in order to form a decoded output signal. In accordance with one embodiment of the disclosed invention, the decoder 260 is a log-MAP decoder that uses a convolutional or turbo decoding algorithm which is the inverse of the encoding algorithm used by encoder 110. However, it will be understood by those skilled in the art that the decoder 260 may be any decoder that is capable of outputting metrics that indicate the quality of the decoded signal. The decoder 260 outputs soft decision log-likelihood metrics (L(c)) for the coded bits. If that encoder 110 used a CC for encoding the bits, decoding is performed at decoder 260 using a symbol-by-symbol log-MAP decoder. If encoder 110 used a turbo code for encoding the bits, decoder 260 preferably performs iterative decoding (for example 6 iterations) using a symbol-by-symbol log-MAP decoder.

The metrics (L(c)) from decoder 260 are applied to a further signal processor 270 which applies a. non-linear saturation function (e.g., tanh ((L(c))/2)) to the metrics in order to form an estimated signal (c). The estimated signal (c) from signal processor 270 is provided to a channel interleaver (il) 272 which outputs a plurality of interleaved estimated signals. Interleaver 272 corresponds substantially to interleaver 120, and consists of $N_T$ block interleavers (not shown), each of which corresponds to one of the $N_T$ traffic channels.

The $N_T$ interleaved estimated signals output by the block interleaver 272 are provided to modulation units 274, where each of the interleaved estimated signals is multiplied with a different one of the Walsh sequences ($w_i$) used by modulation units 130. The modulation units 274 output a plurality of estimated CDMA spread signals that are combined using summer 276 to form a composite estimated signal that is output from summer 276. The composite estimated signal output from summer 276 is applied to a scrambler 278 which scrambles the inphase and quadrature components of the composite signal using pseudo-noise (PN) to form an estimated scrambled signal. Scrambler 278 functions substantially in accordance with scrambler 150. The estimated scrambled signal is then normalized to form a reconstructed signal ($x_1$) by multiplying the estimated scrambled signal with the amplitude factor $(E_c)^{1/2}$ discussed above.

Finally, the interference signal ($z_1$) is formed by applying filter 280 to the reconstructed signal ($x_1$). Filter 280 preferably has an impulse response characteristic (g(k)) that is equal to (h(k)*f(k)) for all non-zero values of k, and the impulse response characteristic (g(k)) of filter 280 is equal to zero when k is zero.

The previous description of the preferred embodiments of the disclosed method and apparatus is provided to enable any person skilled in the art to make or use the claimed invention, which is included within the disclosed method and apparatus. The various modifications to these embodiments will be readily apparent to those skilled in the art, and the generic principles defined herein may be applied to other embodiments without the use of inventive faculty. Thus, the present invention is not intended to be limited to the disclosed method and apparatus shown herein, but is to be determined solely by the claims set forth below.

I claim:

1. A method for reducing co-channel interference in a code division multiple access (CDMA) radio telephone system wherein a traffic channel signal is transmitted from a first station in the system to a second station in the system, comprising the steps of:

(a) forming a reduced interference signal at the second station by subtracting an interference signal from the traffic channel signal, wherein the traffic channel signal contains information representative of a plurality of CDMA data signals each of which is modulated with a different Walsh code prior to transmission of the traffic channel signal from the first station to the second station;

(b) forming a decoded signal at the second station by decoding information representative of the reduced interference signal using a decoder that outputs a plurality of metric values;

(c) forming an estimated signal in accordance with the plurality of metric values, and then forming the interference signal from the estimated signal, wherein the step of forming the interference signal includes the step of forming a plurality of reconstructed CDMA signals from the estimated signal, each of the reconstructed CDMA signals being modulated in accordance with a different one of the Walsh codes.

2. The method of claim 1, wherein the traffic channel signal contains information representative of a plurality of CDMA data signals associated with a single user transmitted from the first station to the second station, and each of the CDMA data signals associated with the single user is modulated with one of the different Walsh codes prior to transmission of the traffic channel signal from the first station to the second station.

3. The method of claim 2, wherein the decoder used in step (b) is a convolutional decoder or a turbo decoder.

4. The method of claim 3, wherein the step of forming the interference signal further includes the step of combining the reconstructed CDMA signals.

5. The method of claim 4, wherein the traffic channel signal is formed at the first station prior to transmission of the traffic channel signal from the first station to the second station, and the step of forming the traffic channel signal at the first station comprises the steps of:

(i) applying a data signal associated with the single user to a convolutional encoder to form an encoded data signal, and then applying the encoded data signal to an interleaver to form a plurality of interleaved signals associated with the single user;

(ii) multiplying each of the interleaved signals with a different one of the Walsh codes to form a plurality of spread signals associated with the single user;

(iii) forming a composite signal by combining the plurality of spread signals associated with the single user; and (iv) scrambling the composite signal with pseudo-noise (PN) sequences.

6. The method of claim 5, wherein the interleaver is formed of a plurality of block interleavers, and each of the block interleavers outputs one of the plurality of interleaved signals associated with the single user.

7. The method of claim 6, wherein the step of applying the encoded data signal to the block interleavers comprises demultiplexing the encoded data signal such that a first contiguous block of code bits from the encoded data signal are input to a first of the block interleavers, a second contiguous block of code bits from the encoded data signal are input to a second of the block interleavers, and a third contiguous block of code bits from the encoded data signal are input to a third of the block interleavers, wherein the first contiguous block of code bits immediately precedes the second contiguous block of code bits in the encoded data signal, and the third contiguous block of code bits comes after the first and second contiguous blocks of code bits in the encoded data signal.

8. The method of claim 5, wherein step (iii) comprises forming the composite signal by combining the plurality of spread signals associated with the single user and at least one signal associated with a second user.

9. The method of claim 5, wherein step (iv) comprises scrambling inphase and quadrature components of the composite signal with PN sequences.

10. The method of claim 5, wherein the different Walsh codes represent a set of Walsh codes, and each Walsh code in the set is orthogonal to all other Walsh codes in the set.

11. The method of claim 5, wherein the convolutional encoder encodes the data signal in accordance with a convolutional code selected from the group consisting of convolutional codes, concatenated codes, and turbo codes.

12. The method of claim 4, further comprising the step of filtering the traffic channel signal prior to subtracting the interference signal from the traffic channel signal.

13. The method of claim 12, wherein the traffic channel signal is transmitted from the first station to the second station along a traffic channel having a first impulse response characteristic, and the filtering step comprises applying a filter having a second impulse response characteristic to the traffic channel signal, wherein the second impulse response characteristic is matched to the first impulse response characteristic.

14. The method of claim 4, wherein step (b) comprises the steps of:

(i) descramblin the reduced interference signal to form a descrambled signal;

(ii) forming a plurality of de-spread signals from the descrambled signal by correlating the descrambled signal with each of the different Walsh codes;

(iii) forming a decoder input signal by de-interleaving the de-spread signals; and (iv) forming the decoded signal at the second station by decoding the decoder input signal using the convolutional decoder that outputs the plurality of metric values.

15. The method of claim 14, wherein the convolutional decoder decodes the decoder input signal in accordance with a convolution code selected from the group consisting of convolutional codes, concatenated codes, and turbo codes.

16. The method of claim 4, wherein the step of forming an estimated signal in accordance with the plurality of metric values comprises the step of applying the metric values to a saturation function.

17. The method of claim 16, wherein the saturation function is a nonlinear saturation function.

18. The method of claim 17, wherein the saturation function provides soft values for the cancellation.

19. The method of claim 4, wherein the step of forming the plurality of reconstructed CDMA signals from the estimated signal comprises the steps of applying the estimated signal to an interleaver to form a plurality of interleaved estimated signals, and multiplying each of the interleaved estimated signals with a different one of the Walsh codes to form a plurality of estimated spread signals.

20. The method of claim 19, wherein the step of combining the reconstructed CDMA signals comprises the steps of forming a composite estimated signal by combining the plurality of estimated spread signals, and scrambling the composite estimated signal with pseudo-noise (PN) sequences to form an estimated scrambled signal.

21. The method of claim 20, wherein the step of scrambling the composite estimated signal with PN sequences comprises scrambling in-phase and quadrature components of the composite estimated signal with PN sequences.

22. The method of claim 20, further comprising the step of forming the interference signal by filtering the estimated scrambled signal.

23. The method of claim 22, further comprising the step of filtering the traffic channel signal prior to subtracting the interference signal from the traffic channel signal, wherein the traffic channel signal is transmitted from the first station to the second station along a traffic channel having a first impulse response characteristic (h(k)), and the filtering step comprises applying a filter having a second impulse response characteristic (f(k)) to the traffic channel signal, wherein the second impulse response characteristic (f(k)) is matched to the first impulse response characteristic (h(k)).

24. The method of claim 23, wherein the step of filtering the estimated scrambled signal comprises filtering the estimated scrambled signal with an interference cancellation filter having a third impulse response characteristic (g(k)).

25. The method of claim 24, wherein the third impulse response characteristic (g(k)) is equal to (h(k)*f(k)) for all non-zero values of k, and the third impulse response characteristic (g(k)) is equal to zero when k is zero.

26. An apparatus for reducing co-channel interference in a code division multiple access (CDMA) radio telephone system wherein a traffic channel signal is transmitted from a first station in the system to and a second station in the system, comprising:

(a) means for forming a reduced interference signal at the second station by subtracting an interference signal from the traffic channel signal, wherein the traffic channel signal contains information representative of a plurality of CDMA data signals each of which is modulated with a different Walsh code prior to transmission of the traffic channel signal from the first station to the second station;

(b) means for forming a decoded signal at the second station by decoding information representative of the reduced interference signal using a decoder that outputs a plurality of metric values;

(c) means for forming an estimated signal in accordance with the plurality of metric values;

(d) means for forming the interference signal from the estimated signal, wherein the means for forming the interference signal includes means for forming a plurality of reconstructed CDMA signals from the estimated signal, each of the reconstructed CDMA signals being modulated in accordance with a different one of the Walsh codes.

27. An apparatus for reducing co-channel interference in a code division multiple access (CDMA) radio telephone system wherein a traffic channel signal is transmitted from a first station in the system to and a second station in the system, comprising:

(a) a signal subtractor that forms a reduced interference signal at the second station by subtracting an interference signal from the traffic channel signal, wherein the traffic channel signal contains information representative of a plurality of CDMA data signals each of which is modulated with a different Walsh code prior to transmission of the traffic channel signal from the first station to the second station;

(b) a decoder that forms a decoded signal at the second station by decoding information representative of the reduced interference signal using a decoding algorithm that outputs a plurality of metric values;

(c) a signal estimator that forms an estimated signal in accordance with the plurality of metric values;

(d) a signal reconstructor that forms the interference signal from the estimated signal, wherein the signal reconstructor includes at least one modulator for forming a plurality of reconstructed CDMA signals from the estimated signal, each of the reconstructed CDMA signals being modulated in accordance with a different one of the Walsh codes.

* * * * *